(12) United States Patent
Kulkarni et al.

(10) Patent No.: US 8,930,644 B2
(45) Date of Patent: Jan. 6, 2015

(54) CONFIGURABLE TRANSACTIONAL MEMORY FOR SYNCHRONIZING TRANSACTIONS

(75) Inventors: Chidamber R. Kulkarni, Hyderabad (IN); Christoforos Kachris, Athens (GR)

(73) Assignee: Xilinx, Inc., San Jose, CA (US)

( * ) Notice: Subject to any disclaimer, the term of this patent is extended or adjusted under 35 U.S.C. 154(b) by 1954 days.

(21) Appl. No.: 12/114,567

(22) Filed: May 2, 2008

(65) Prior Publication Data

US 2009/0276599 A1    Nov. 5, 2009

(51) Int. Cl.
G06F 12/00 (2006.01)
G06F 13/00 (2006.01)
G06F 13/28 (2006.01)
G06F 9/46 (2006.01)
G06F 9/52 (2006.01)

(52) U.S. Cl.
CPC . *G06F 9/466* (2013.01); *G06F 9/52* (2013.01)
USPC ........................................................ 711/150

(58) Field of Classification Search
None
See application file for complete search history.

(56) References Cited

U.S. PATENT DOCUMENTS

| | | | |
|---|---|---|---|
| 6,816,947 B1 | 11/2004 | Huffman | |
| 2007/0198792 A1 | 8/2007 | Dice et al. | |

FOREIGN PATENT DOCUMENTS

| | | |
|---|---|---|
| CN | 1484169 A | 3/2004 |
| CN | 1993674 A | 7/2007 |
| CN | 101127005 A | 2/2008 |
| GB | 2 379 523 A | 3/2003 |
| WO | WO 2004-075051 A1 | 9/2004 |
| WO | WO 2008-005687 A2 | 1/2008 |

OTHER PUBLICATIONS

Herlihy, M. et al., "Transactional memory: architectural support for lock-free data structures", ISCA '93 Proceedings of the 20th annual international symposium on Computer architecture, IEEE, 1993.*
Hammond, L. et al, 2004. "Transactional Memory Coherence and Consistency". In Proceedings of the 31st annual international symposium on Computer architecture (ISCA '04). IEEE Computer Society, Washington, DC.*
Herlihy, Maurice et al., "Transactional Memory: Architectural Support for Lock-Free Data Structures," *Proc. of the 20th Annual International Symposium on Computer Architecture*, May 21, 1993, pp. 289-300, vol. 21, Issue 2, San Diego, California, USA.

* cited by examiner

*Primary Examiner* — Michael Alsip
(74) *Attorney, Agent, or Firm* — LeRoy D. Maunu

(57) ABSTRACT

A configurable transactional memory synchronizes transactions from clients. The configurable transactional memory includes a memory buffer and a transactional buffer. The memory buffer includes allocation control and storage, and the allocation control is configurable to selectively allocate the storage between a transactional buffer and a data buffer for the data words. The transactional buffer stores state indicating each combination of a data word and a client for which the data word is referenced by a write access in the transaction in progress from the client. The transactional arbiter generates the completion status for the transaction in progress from each client. The completion status is either committed for no collision or aborted for a collision. A collision is an access that references a data word of the transaction from the client following a write access that references the data word of another transaction in progress from another client.

15 Claims, 5 Drawing Sheets

CONFIGURABLE TRANSACTIONAL MEMORY FOR SYNCHRONIZING TRANSACTIONS

FIELD OF THE INVENTION

The present invention generally relates to transactional memories, and more particularly to configurable transactional memories.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks including block RAM (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

A user design may implement a multiprocessing system in a PLD that includes multiple dedicated processors. A user design may also implement a multiprocessing system by implementing soft processors in the programmable logic and interconnect resources of the PLD. An example user design may implement a multiprocessing system in a PLD using a dedicated processor and a soft processor that is a state machine specifically designed to implement a particular function of the user design.

To perform the function of the user design, the processors may need to exchange data. It may be time consuming and expensive to design the protocols for exchanging data between the processors of a multiprocessing system. The exchange of data between the processors may limit the performance of the multiprocessing system.

The present invention may address one or more of the above issues.

SUMMARY OF THE INVENTION

Various embodiments of the invention provide a configurable transactional memory for synchronizing transactions from clients. Each client has a transaction in progress until a completion status is generated for the transaction. The transaction in progress from the client includes one or more accesses. Each access is either a read access or a write access referencing a data word in the configurable transactional memory. The configurable transactional memory includes a memory buffer and a transactional buffer. The memory buffer includes allocation control and storage. The allocation control is configurable to selectively allocate the storage between a transactional buffer and a data buffer for the data words. The transactional buffer stores state indicating each combination of a data word and a client for which the data word is referenced by a write access in the transaction in progress from the client. In response to the state, the transactional arbiter generates the completion status for the transaction in progress from each client. The completion status is either committed in response to an absence of a collision or aborted in response to a presence of a collision. The collision is present for an access that references a data word of the transaction from the client following a write access that references the data word of another transaction in progress from another client.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
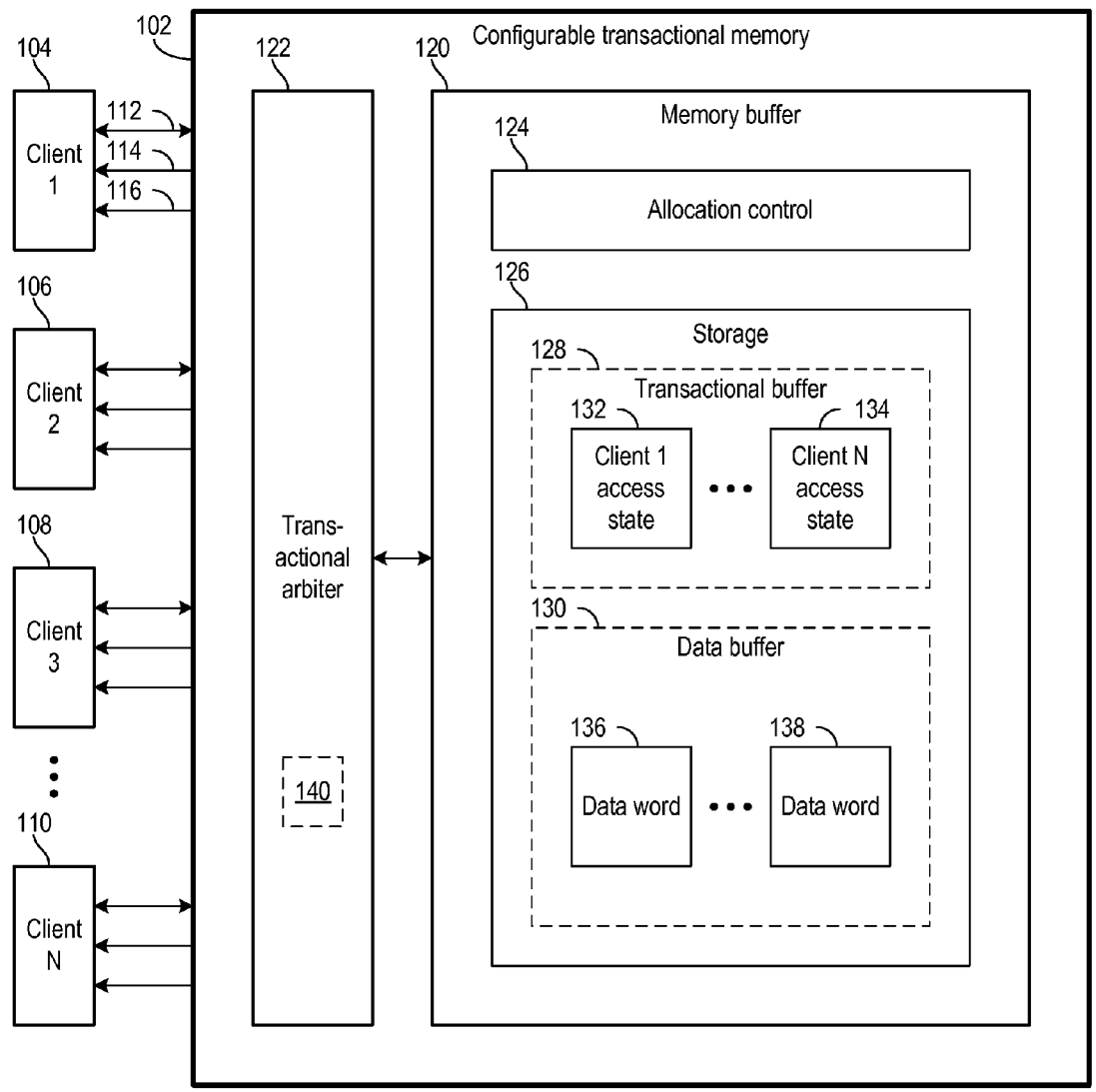
FIG. 1 is a block diagram of a system illustrating a configurable transactional memory in accordance with various embodiments of the invention.

FIG. 1 is a block diagram of a system illustrating a configurable transactional memory 102 in accordance with various embodiments of the invention. Each client 104 through 110 may be a processor or a state machine for processing transactions.

The clients 104 through 110 of a multiprocessor system may efficiently exchange data using read and write accesses to a configurable transactional memory 102. The configurable transactional memory 102 may synchronize the exchange of data without using locks or mutexes. Compared to locks or mutexes, the configurable transactional memory 102 may provide better performance and simpler protocols for exchanging data. Performance may be improved because the overhead of locks and mutexes is eliminated. The protocols may be simpler because synchronization is provided by the configurable transactional memory 102 instead of user-supplied locks and/or mutexes. The simplified synchronization of data exchange using configurable transactional memory 102 may improve robustness by eliminating user-supplied locks and/or mutexes that are complex and prone to error.

The configurable transactional memory 102 may synchronize transactions from clients 104 through 110. A transaction may include multiple read and/or write accesses, and the configurable transactional memory 102 should process these accesses as an atomic operation. The configurable transactional memory 102 may successfully complete the accesses of the transaction after atomically performing the accesses. If a conflict prevents the configurable transactional memory 102 from atomically performing the accesses, the configurable transactional memory 102 may abort the transaction. After the configurable transactional memory 102 aborts a transaction from client 104, client 104 may later retry the transaction. The configurable transactional memory 102 might successfully complete the retried transaction when the conflict has cleared.

Example applications for configurable transactional memory 102 include network processing and query processing for a database. Each transaction from one of clients 104 through 110 may be readily specified in a localized region of the control flow of a software program executed by a processor or in a localized sequence of states of a state machine.

In an example scenario, client 104 may issue a transaction on line 112 to configurable transactional memory 102. If the configurable transactional memory 102 successfully completes the accesses of the transaction as an atomic operation, the configurable transactional memory 102 may respond with a commit signal on line 114. If the configurable transactional memory 102 could not atomically perform the accesses of the transaction because of a collision conflict with another transaction from another client 106, the configurable transactional memory 102 may respond with an abort signal on line 116.

The configurable transactional memory 102 may include a memory buffer 120 and a transactional arbiter 122. The memory buffer 120 may include allocation control 124 and storage 126. Allocation control 124 may divide the storage 126 between a transactional buffer 128 and a data buffer 130. The transactional buffer 128 may include states 132 through 134 for tracking the accesses of clients 104 through 110, respectively. Each access of the transactions may read or write one of data words 136 though 138 or a portion of one of these data words.

In one embodiment, each client 104 through 110 may issue one transaction at a time, and each transaction may include multiple accesses that each read or write one of data words 136 through 138. State 132 may track the accesses of the current transaction in progress from client 104. State 132 may include a read bit for each data word 136 through 138 that is read or referenced by the current transaction from client 104, and state 132 may include a write bit for each data word 136 through 138 that is written or referenced by the current transaction from client 104. For each access of the current transaction from client 104, the transactional arbiter 122 may update the state 132 to set the read or write bit as appropriate for the type of access to the data word.

In an example scenario, for each access of the current transaction from client 104, transactional arbiter 122 checks the states of the other clients, for example, state 134, for a collision with a write access in an in-progress transaction from another client, for example, client 110. If the state 134 indicates the current transaction from client 110 has referenced the data word, then transactional arbiter 122 updates state 132 for client 104 to indicate the presence of the collision. The transaction arbiter 122 may similarly check for a collision between the access and the current transaction from the other clients 106 and 108.

After client 104 has completed the accesses of the current transaction, client 104 may request completion of the transaction. For example, client 104 may issue a commit request on line 112 to request completion of the transaction. Transactional arbiter 122 may check state 132 for the presence of a collision. If a collision is present, transactional arbiter 122 may generate a completion status of aborted by asserting the abort signal on line 116. For the absence of a collision, transactional arbiter 122 may generate a completion status of committed by asserting the commit signal on line 114. The transactional arbiter 122 may also clear the state 132 to indicate that the current transaction from client 104 is no longer in progress.

It will be appreciated that configurable transactional memory 102 may support multiple transactions in progress from each client. For example, configurable transactional memory 102 may support two current transactions in progress from a client that is a virtual combination of clients 104 and 106.

In one embodiment, configurable transactional memory 102 supports accesses both within and outside of transactions. For example, transactions may include accesses that read or write only data word 136, and other accesses outside the transaction may read or write only data word 138. Thus, a portion of the data buffer 130 may be allocated for atomic transactions and another portion of the data buffer may be allocated for non-atomic accesses.

In another embodiment, allocation control 124 may be included as a component 140 of transaction arbiter 122. For example, memory buffer 120 may include only storage 126 that is one or more block RAMs of a PLD. Transactional arbiter 122 may be dedicated logic of the PLD that may be configured with the size of the transactional buffer 128 and the data buffer 130.

In one embodiment, states 132 through 134 are included in respective entries in transactional buffer 128 for the data words accessed by one or more of the current transactions in progress from clients 104 through 110. Transactional arbiter 122 may create an entry in transactional buffer 128 for each access to a data word without an already existing entry. Transactional arbiter 122 may delete an entry from transactional buffer when no in-progress transaction references the data word for the entry.

Figure 2:
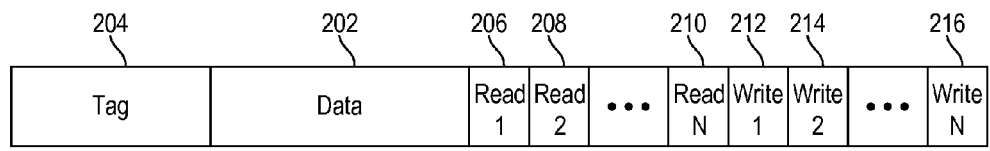
FIG. 2 is a field diagram of an example entry for tracking accesses to a data word in accordance with various embodiments of the invention.

FIG. 2 is a field diagram of an example entry for tracking accesses to a data word in accordance with various embodiments of the invention. The tag field 204 contains an address tag of the one of data words 136 through 138 referenced by the access. The data field 202 contains a temporary copy of the data word. The read fields, read 1, read 2, . . . read N (206, 208, and 210) and write fields write 1, write 2, . . . write N (212, 214, and 216) are used to indicate the type of the access (read or write) and the one of clients 1-N that is the source of the access. For each access to a data word without an existing entry, the transactional arbiter creates a new entry in the transactional buffer with the format shown in FIG. 2. For example, to create a new value of the data word 136 from data buffer 130 into the data field 202 of the new entry in transactional buffer 128. The transactional arbiter 122 sets the tag field 204 of the new entry to the storage 126 address of the data word 136. The transactional arbiter 122 initializes the tracking state of fields 206 through 216 in the new entry by clearing these fields.

In an example scenario, for each read access of a transaction from client 106, the transactional arbiter 122 sets the corresponding read bit field 208 of the entry for the data word referenced by the read access. In another example, for each write access of a transaction from client 106, the write field 214 is set in the entry for the data word referenced by the write access, unless there is a collision because one of the other write fields 212 and 216 is already set. Although multiple read fields 206 through 210 may be set, usually at most one of write fields 212 through 216 is set. For each write access of a transaction from client 106, the transactional arbiter 122 may write the write data of the write access to the data field 202 of the entry for the data word. For an access of a transaction from another client, for example, client 104, to the same data word, the transactional arbiter 122 may check whether any of write fields 212 through 216 are already set in the entry. If any of the write fields 212 through 216 are already set, the transactional arbiter 122 may abort the transaction from client 104 because of the collision with the transaction in progress from another client.

On successful or aborted completion of a transaction from client 104, the transactional arbiter 122 may clear the read field 206 and the write field 212 of the entries for every data word accessed by the transaction. If the clearing of field 206 and 212 causes all fields 206 through 216 of the entry for data word 136 to become cleared, no transaction in progress is referencing data word 136. The transactional arbiter 122 may then delete the entry from the transactional buffer 128. For an aborted transaction, the transactional arbiter 122 may delete the entry including discarding the data field 202 of the entry. For a successfully committed transaction that had the write field 212 set in the entry for data word 136, the transactional arbiter 122 may first transfer the data field 202 of the entry from the transactional buffer 128 to the data word 136 in the data buffer 130.

In one embodiment, for each read access of a transaction from client 106, the transactional arbiter 122 may set the read field 208 of the entry unless the write field 214 is already set. For each write access of a transaction from client 106, the transactional arbiter 122 may clear the read field 208 of the entry and set the write field 214 of the entry. For an access of a transaction from another client 104 to the same data word when any of write fields 212 through 216 is already set in the entry, the transactional arbiter 122 may indicate the presence of a collision by setting both the read field 206 and the write field 212 in the entry.

Figure 3:
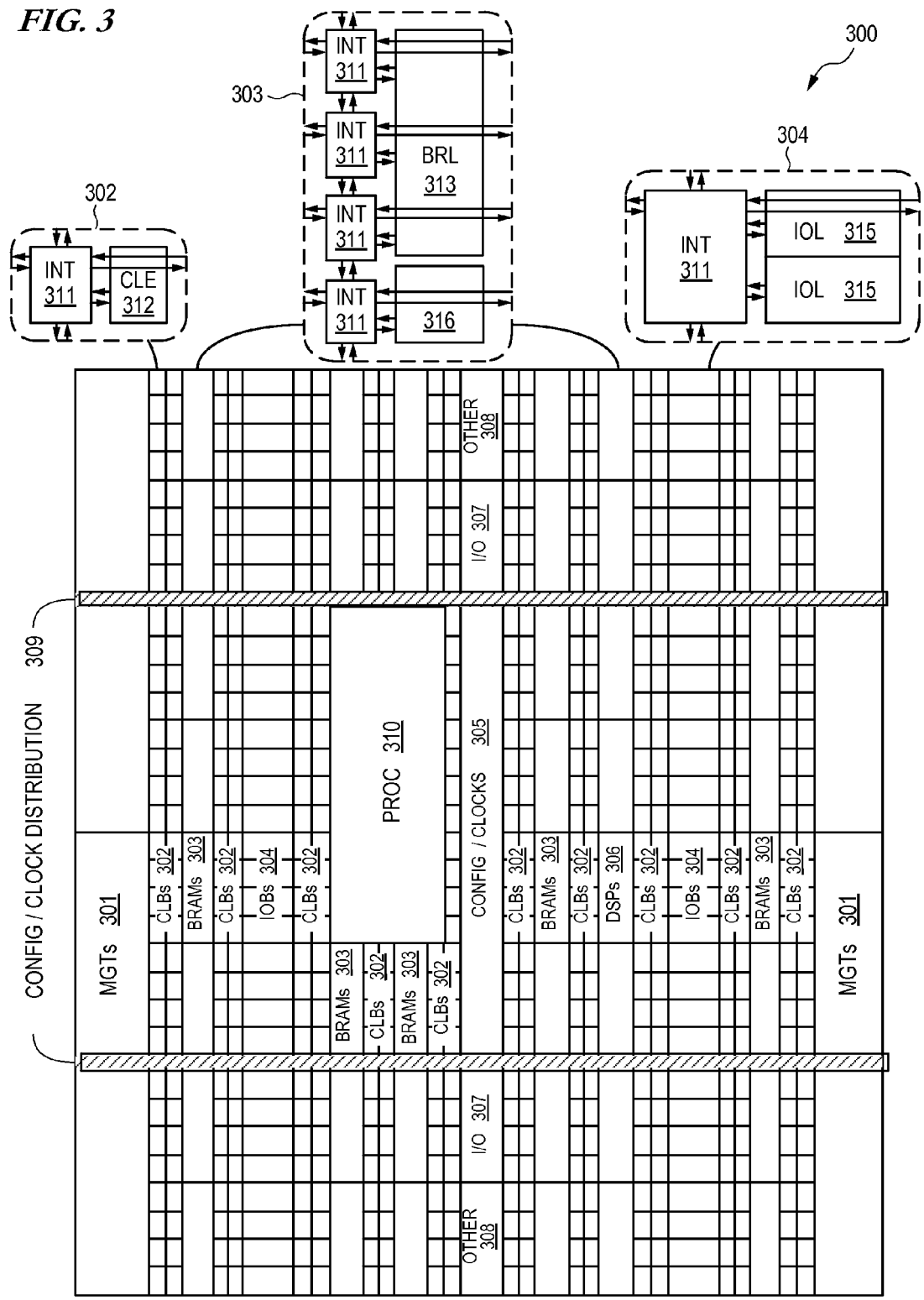
FIG. 3 is a block diagram of a programmable logic device that may include a configurable transaction memory in accordance with one or more embodiments of the invention.

FIG. 3 is a block diagram of a programmable logic device that may include a configurable transaction memory in accordance with one or more embodiments of the invention.

As noted above, advanced PLDs can include several different types of programmable logic blocks in the array. For example, FIG. 3 illustrates an FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) and a transactional arbiter 316 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. Similarly, a DSP tile 306 can include a DSP logic element in addition to an appropriate number of programmable interconnect elements. An IOB 304 can include, for example, two instances of an input/output logic element (IOL 315) in addition to one instance of the programmable interconnect element (INT 311). As will be clear to those of skill in the art, the actual I/O pads connected, for example, to the I/O logic element 315 are manufactured using metal layered above the various illustrated logic blocks, and typically are not confined to the area of the input/output logic element 315.

The BRAM logic element 313 may be used as a block memory by a user design that disables the transaction arbiter 316. Together, the BRAM logic element 313 and the transaction arbiter 316 may implement a configurable transactional memory. It will be appreciated that certain BRAM 303 of architecture 300 may omit the transaction arbiter 316.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

Figure 4:
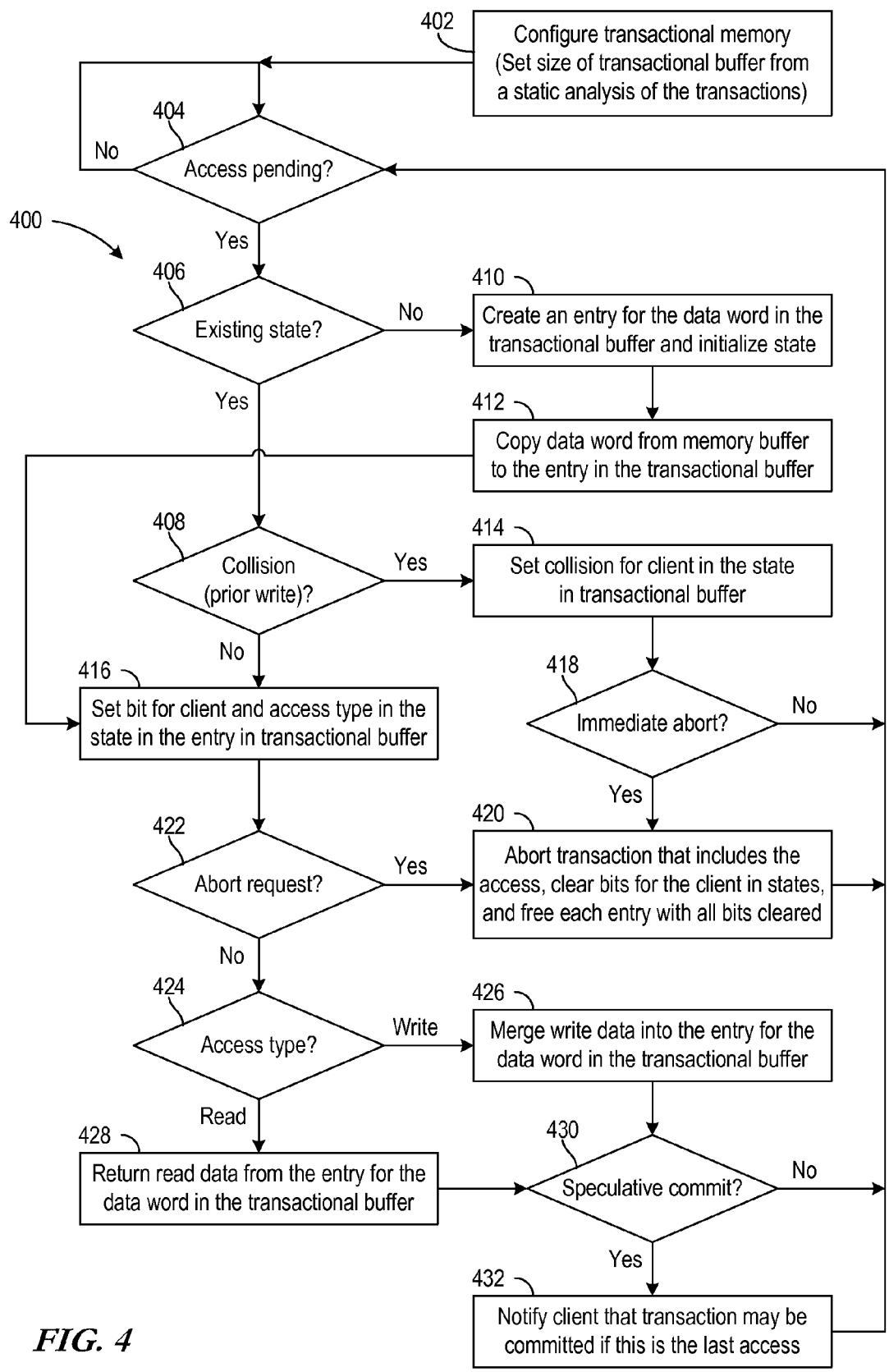
FIG. 4 is a flow diagram of a process for tracking accesses of transactions for a configurable transactional memory in accordance with various embodiments of the invention.

FIG. 4 is a flow diagram of a process 400 for tracking accesses of transactions for a configurable transactional memory in accordance with various embodiments of the invention. The configurable transactional memory may store state for tracking the accesses of the transactions.

At step 402, configuration data is generated for the configurable transactional memory and the configurable transactional memory is configured with the configuration data. Various aspects of configurable transactional memory may be configured. A number of block RAMs may be selected to set the total size of storage in a memory buffer. The storage in the memory buffer may be allocated between a transactional buffer for tracking transactions and a data buffer for storing data words read and written by accesses of the transaction. A mode may be selected for how to notify a client of the completion of a transaction from the client. Two clients may have differing notification modes.

Decision 404 waits for an access from a client. The access may be a read, write, or read-modify-write access to a specified data word or a portion of a specified data word.

Decision 406 checks whether the data word already has tracking state in the transactional buffer. If the data word already has tracking state from a transaction in progress, process 400 proceeds to decision 408; otherwise, process 400 proceeds to step 410. At step 410, an entry for the data word is created in the transactional buffer with the tracking state cleared. At step 412, the data word is copied from the memory buffer to the entry in the transactional buffer.

Decision 408 checks whether an in-progress transaction from a different client has referenced the data word as indicated by the existing state for the data word. If the existing state indicates a collision from a prior write, process 400 proceeds to step 414; otherwise, process 400 proceeds to step 416.

At step 416, a bit for the client may be set in the tracking state of the entry in the transactional buffer for the data word. If the access is a read access, a read bit for the client may be set in the entry for the data word, and if the access is a write access, a write bit for the client may be set in the entry for the data word.

At step 414, a collision bit may be set for the client in the tracking state of the entry for the data word. A transaction is aborted if there is a collision for an access of the transaction. However, the transaction may be aborted either immediately or after processing the other accesses of the transaction. Decision 418 checks whether the configurable transactional memory was configured at step 402 to immediately abort the transaction. For the immediate abort mode, process 400 proceeds to step 420; otherwise, process 400 returns to decision 404 to wait for the next access from one of the clients.

A transaction may also be aborted on request from the client issuing the transaction. Decision 422 checks whether the client has requested that the transaction be aborted. For an abort request, process 400 proceeds to step 420; otherwise, process 400 proceeds to decision 424. It will be appreciated that abort requests may be processed asynchronously. For example, another process may check for abort requests from the clients.

At step 420, the transaction of the current access is aborted. The bits of the tracking state for the client are cleared in the entry or entries of every data word accessed by the transaction. If a particular data word has not been accessed by any current transaction in progress from the other clients, the clearing of the bits for the client may clear the entire tracking state of the entry. Any write data in the entry may be discarded and the entry may be deleted from the transactional buffer.

Decision 424 checks the access type of the current access to a data word. If the access is a write access then process 400 proceeds to step 426, and if the access is a read access then process 400 proceeds to step 428. At step 426, the write data of the write access is written into the entry in the transactional buffer for the data word. For a write access that writes a portion of a data word, the write data may be merged with the data in the entry for the data word. At step 428, read data from the entry for the data word is returned to the client.

Decision 430 checks whether configurable transactional memory was configured at step 402 to speculatively commit transactions. For speculative commit mode, process 400 proceeds to step 432; otherwise, process 400 returns to decision 404 to await the next access. At step 432, the client issuing the access is notified that the client may commit the transaction if the transaction does not include any more accesses. If the transaction includes another access, another speculative commit may be generated for this additional access. The client may still be expected to request a commit of the transaction that causes the configurable transactional memory to clean up the tracking state for the transaction.

Figure 5:
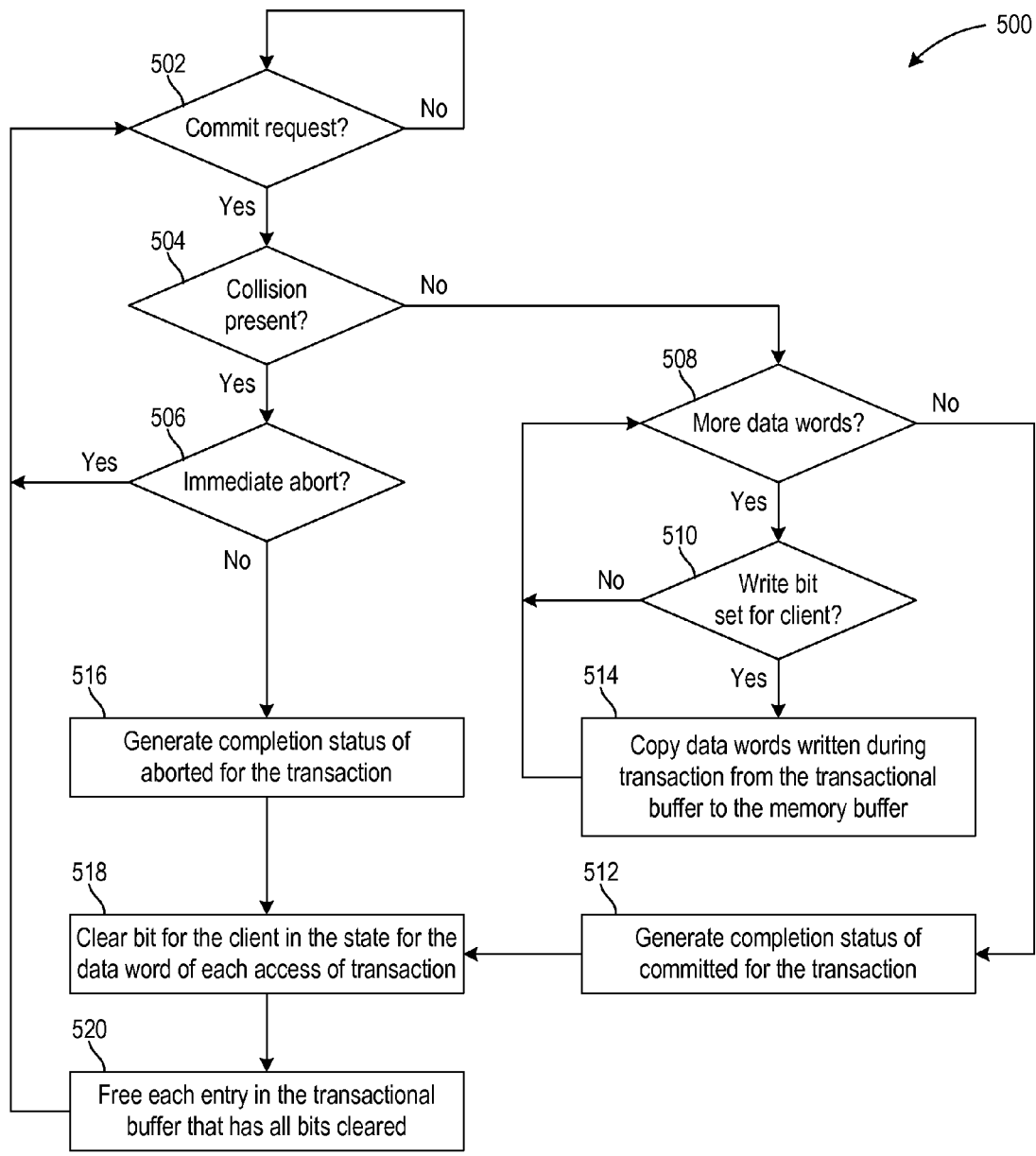
FIG. 5 is a flow diagram of a process for completing transactions for a configurable transactional memory in accordance with various embodiments of the invention.

FIG. 5 is a flow diagram of a process for completing transactions for a configurable transactional memory in accordance with various embodiments of the invention. The configurable transactional memory may successfully complete the current transaction if the transaction does not have a collision. The configurable transactional memory may abort the current transaction if the transaction does have a collision.

Decision 502 waits for a commit request for the current transaction from a client. Decision 504 checks whether a collision is present for the client. Tracking state may indicate whether a collision was previously detected for an access of the current transaction. If a collision is present, process 500 proceeds to decision 506; otherwise, process 500 proceeds to decision 508.

Decision 508 checks whether the current transaction has accessed more data words. A transaction arbiter may scan through the entries in the transaction buffer to find the next entry having set state bits for the client. If the current transaction has accessed another data word, then process 500 proceeds to decision 510; otherwise, process 500 proceeds to step 512. At step 510, the entry for the data word is checked for a set write bit for the client. If the write bit is set in the entry for the data word, process 500 proceeds to step 514; otherwise process 500 returns to decision 508. At step 514, data including write data for the current transaction is copied from the entry in the transactional buffer to the data word in the data buffer.

At step 512, the configurable transactional memory generates a committed completion status for the current transaction, and the current transaction is no longer in progress.

Decision 506 checks the abort mode. For an immediate abort mode, process 500 returns to decision 502 because the transaction has already been aborted. Otherwise, process 500 proceeds to step 516 to abort the transaction. At step 516, the configurable transactional memory generates an aborted completion status for the current transaction, and the current transaction is no longer in progress.

At step 518, the state tracking bits for the client are cleared in the entry for each access of the current transaction. At step 520, each entry that has all state tracking bits clear is deleted from the transactional buffer.

Figure 6:
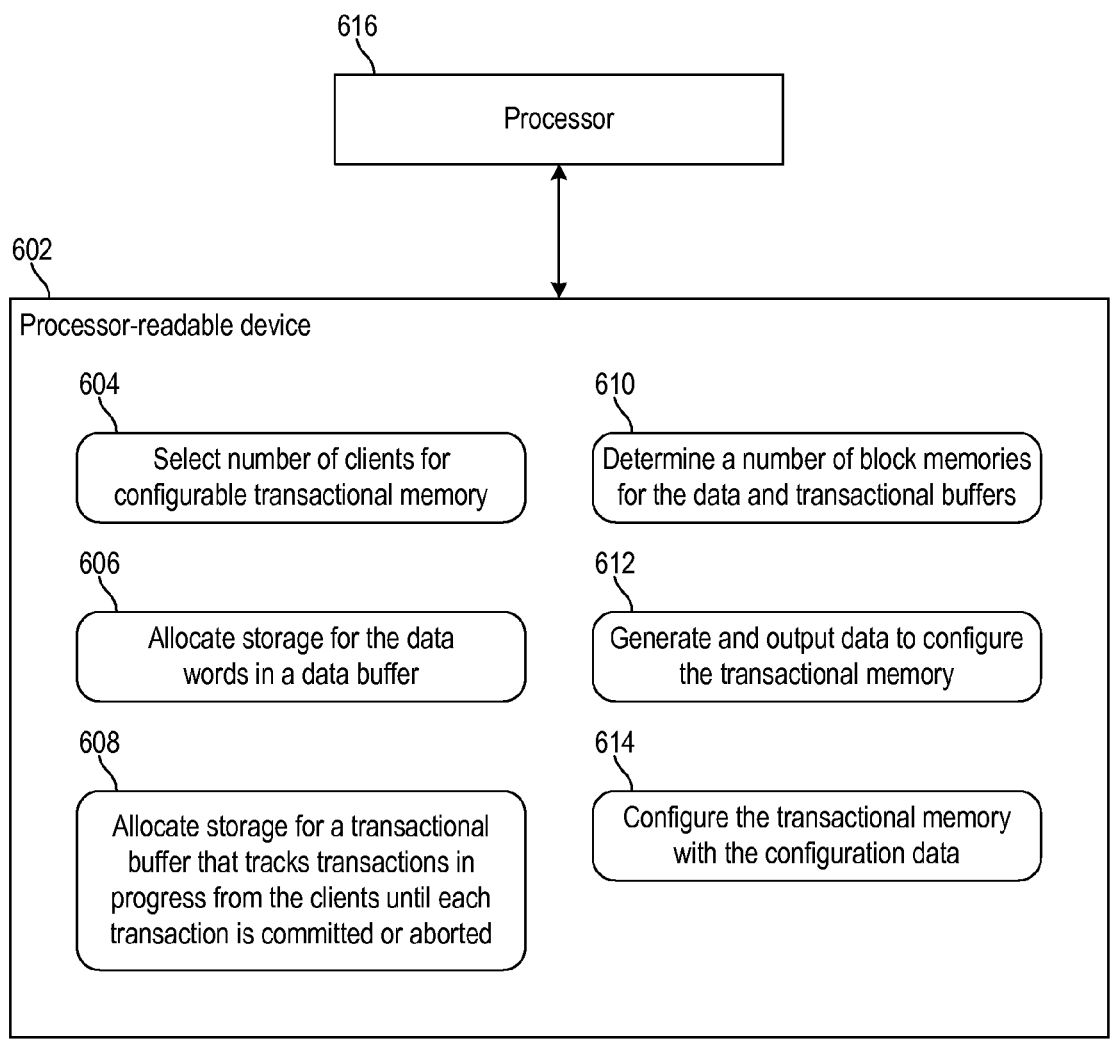
FIG. 6 is a block diagram of a system for configuring a configurable transactional memory in accordance with various embodiments of the invention.

FIG. 6 is a block diagram of a system for configuring a configurable transactional memory in accordance with various embodiments of the invention. An initial step in the usage of a configurable transactional memory may include configuring the configurable transactional memory for synchronizing a specified set of transactions for a particular user design.

A processor-readable device 602 may be configured with software modules 604 through 614 for configuring a configurable transactional memory. Execution of the instructions in software module 604 may cause processor 616 to select a number of the clients for the configurable transactional memory. Software module 606 may cause processor 616 to allocate storage for data words in a data buffer of the configurable transactional memory. Software module 608 may cause processor 616 to allocate storage for a transactional buffer of the configurable transactional memory.

A static analysis of the transactions specified in software for the clients may set the size of the transaction buffer. A compiler may statically analyze the transactions during compilation of the software. While a non-configurable transactional memory may have equal amounts of storage for the transactional and data buffers to support any possible set of transactions, the static analysis of the actual set of transactions may permit allocating less than half of the storage to the transactional buffer of the configurable transactional memory. Because less storage is needed, the configurable transactional memory may more efficiently implement a transactional memory for any particular set of transactions. Because the amount of storage can be determined for any given set of transactions, the configurable transactional memory may still support any possible set of transactions.

Software module 610 may cause processor 616 to determine a number of block RAMs for a memory buffer that includes the data and transactional buffers. Software module 612 may cause processor 616 to generate and output configuration data for configuring the configurable transactional memory to support the number of clients using the number of block RAMs for the memory buffer. Software module 614 may cause processor 616 to configure the configurable transactional memory with the configuration data.

The present invention is thought to be applicable to a variety of transactional memory systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A configurable transactional memory for synchronizing a plurality of transactions from a plurality of clients, each client having a respective transaction in progress until a completion status is generated for the respective transaction, the respective transaction in progress from the client including at least one access, each access is one of a read access or a write access referencing a location in the configurable transactional memory, comprising:

a memory buffer including allocation control and storage, wherein the allocation control is configurable to selectively allocate the storage between a transactional buffer and a data buffer for the data words, the transactional buffer arranged to store state indicating each combination of a data word and a client for which the data word is referenced by a write access in the respective transaction in progress from the client; and a transactional arbiter coupled to the memory buffer and configured to generate, in response to the state, the completion status of the respective transaction in progress from each client, wherein the completion status is one of committed in response to an absence of a collision and aborted in response to a presence of a collision, and the collision is present for an access that references a data word of the respective transaction from the client following a write access that references the data word of another transaction in progress from another client;

wherein the transactional arbiter notifies the client that the client is permitted to commit the respective transaction because of the absence of the collision for the respective transaction.

2. The configurable transactional memory of claim 1, wherein the allocation control of the memory buffer is configurable to select a number of the clients.

3. The configurable transactional memory of claim 1, wherein the allocation control of the memory buffer is configurable to allocate more than half of the storage to the data buffer.

4. The configurable transactional memory of claim 1, wherein the allocation control of the memory buffer is configurable to allocate a portion of the storage to the transactional buffer according to a static analysis of the transactions from the clients.

5. The configurable transactional memory of claim 1, wherein the allocation control of the memory buffer is configurable to allocate a first portion of the storage to the transactional buffer, a second portion of the storage to the data buffer for the data words, and a third portion of the storage to the data buffer for additional data words of additional accesses that are not included in the transactions.

6. The configurable transactional memory of claim 1, wherein the transactional arbiter updates the state in the transactional buffer to indicate each combination of a data word and a client for which the data word is referenced by a write access in the respective transaction in progress from the client, and the transactional arbiter updates the state in the transactional buffer to indicate each combination of a data word and a client for which the data word is referenced by a read access in the respective transaction in progress from the client.

7. The configurable transactional memory of claim 1, wherein the respective transaction from each client is no longer in progress following the transactional arbiter generating the completion status of the respective transaction.

8. The configurable transactional memory of claim 1, wherein the transactional arbiter generates the completion status of committed for the respective transaction in progress from the client in response to a commit request from the client and the absence of the collision.

9. The configurable transactional memory of claim 1, wherein the transactional arbiter generates the completion status of aborted for the respective transaction in progress from the client in response to a commit request from the client and the presence of the collision.

10. The configurable transactional memory of claim 1, wherein the transactional arbiter generates the completion status of aborted for the respective transaction in progress from the client in response to the collision.

11. The configurable transactional memory of claim 1, wherein the transactional arbiter generates the completion status of aborted for the respective transaction in progress from the client in response to an abort request from the client.

12. The configurable transactional memory of claim 1, wherein the transactional arbiter is configurable to notify the client that the respective transaction is aborted in response to a selectable one of the collision and a commit request from the client together with the presence of the collision.

13. A configurable transactional memory for synchronizing a plurality of transactions from a plurality of clients, each client having a respective transaction in progress until a completion status is generated for the respective transaction, the respective transaction in progress from the client including at least one access, each access is one of a read access or a write access referencing a location in the configurable transactional memory, comprising:

a memory buffer including allocation control and storage, wherein the allocation control is configurable to selectively allocate the storage between a transactional buffer and a data buffer for the data words, the transactional buffer arranged to store state indicating each combination of a data word and a client for which the data word is referenced by a write access in the respective transaction in progress from the client; and a transactional arbiter coupled to the memory buffer and configured to generate, in response to the state, the completion status of the respective transaction in progress from each client, wherein the completion status is one of committed in response to an absence of a collision and aborted in response to a presence of a collision, and the collision is present for an access that references a data word of the respective transaction from the client following a write access that references the data word of another transaction in progress from another client;

wherein, in response to the respective transaction from the client having the completion status of committed, the transactional arbiter transfers write data of each write access of the respective transaction from the transactional buffer to the data buffer.

14. The configurable transactional memory of claim 1, wherein the memory buffer is at least one of a plurality of block memories of a programmable logic device.

15. The configurable transactional memory of claim 1, wherein the transactional arbiter is a dedicated circuit of a programmable logic device having an array of programmable logic and interconnect resources that are configurable by loading configuration data into the programmable logic device.

* * * * *